(12) United States Patent
Dolganow et al.

(10) Patent No.: US 7,940,683 B2
(45) Date of Patent: *May 10, 2011

(54) IN-BOUND MECHANISM THAT VERIFIES END-TO-END SERVICE CONFIGURATION WITH APPLICATION AWARENESS

(75) Inventors: Andrew Dolganow, Kanata (CA); Steven Edward Morin, Ottawa (CA); Anthony Peres, Ottawa (CA)

(73) Assignee: Alcatel Lucent, Paris (FR)

( * ) Notice: Subject to any disclaimer, the term of this patent is extended or adjusted under 35 U.S.C. 154(b) by 251 days.

This patent is subject to a terminal disclaimer.

(21) Appl. No.: 12/073,107

(22) Filed: Feb. 29, 2008

(65) Prior Publication Data

US 2009/0219812 A1 Sep. 3, 2009

(51) Int. Cl.
*H04J 3/14* (2006.01)
(52) U.S. Cl. .......................... 370/249; 709/224
(58) Field of Classification Search .................. 370/229, 370/231, 235, 241.1, 249, 252, 253, 395.21, 370/395.3; 709/224
See application file for complete search history.

(56) References Cited

U.S. PATENT DOCUMENTS

| | | |
|---|---|---|
| 6,973,085 B1 | 12/2005 | Acharya |
| 2005/0163047 A1* | 7/2005 | McGregor et al. ............ 370/229 |
| 2007/0028001 A1 | 2/2007 | Phillips et al. |
| 2009/0086651 A1* | 4/2009 | Luft et al. ..................... 370/253 |

FOREIGN PATENT DOCUMENTS

WO  0219055 A3  3/2002

OTHER PUBLICATIONS

Lakshmipriya TKS et al., "An ASM Model for an Autonomous Network-Infrastructure Grid" Networking and Services, 2007, ICNS. 3rd International Conference On, IEEE P1.

* cited by examiner

*Primary Examiner* — Seema S Rao
*Assistant Examiner* — Leon Andrews
(74) *Attorney, Agent, or Firm* — Krammer & Amado, PC

(57) ABSTRACT

A method of using deep packet inspection (DPI) to verify a service configuration. The method may include one or more of the following: building an application specific service ping packet having an application identification field that identifies an application to which the application specific service ping packet corresponds; forwarding the application specific service ping packet towards a destination in a network; determining static configuration information regarding the application to which the application specific service ping packet corresponds at a network interface of a network element; inserting the static configuration information into the application specific service ping packet; determining at least one policy that applies to a flow including the application specific service ping packet; inserting the at least one policy into the application specific service ping packet; and extracting the service ping packet from the network.

22 Claims, 3 Drawing Sheets

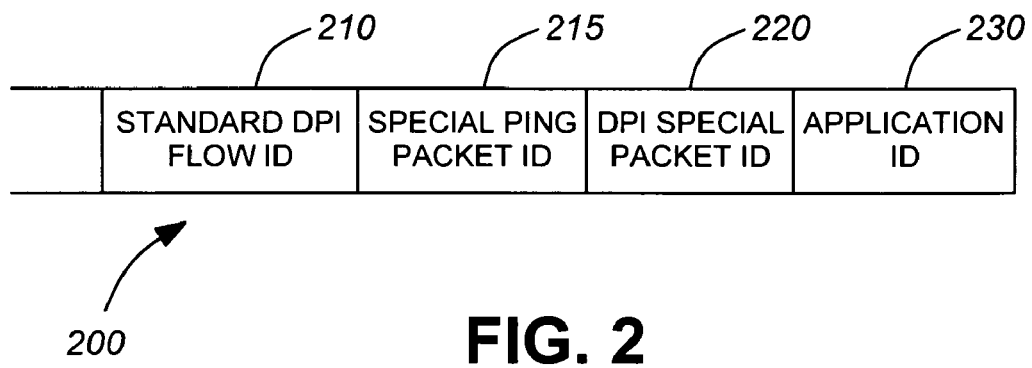
FIG. 2
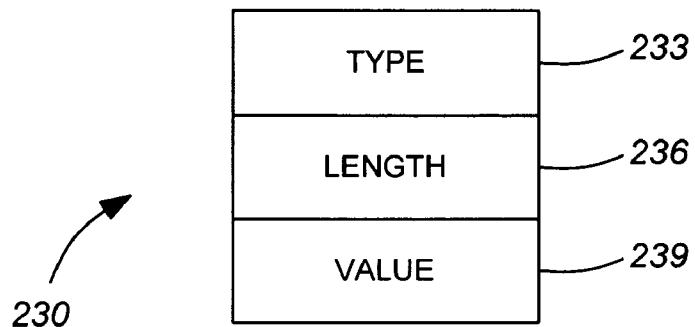
FIG. 3
FIG. 4

IN-BOUND MECHANISM THAT VERIFIES END-TO-END SERVICE CONFIGURATION WITH APPLICATION AWARENESS

BACKGROUND OF THE INVENTION

1. Field of the Invention

This invention relates generally to packet based communications using deep packet inspection (DPI).

2. Description of Related Art

In its existing form, DPI is a sort of computer network packet filtering that examines data and/or header part of a packet as it passes an inspection point, searching for non-protocol compliance, viruses, spam, intrusions or predefined criteria to decide if the packet can pass or if it needs to be routed to a different destination, or for the purpose of collecting statistical information. DPI is also sometimes called Content Inspection or Content Processing. DPI is in contrast to shallow packet inspection (usually called just packet inspection) which just checks the header portion of a packet.

DPI devices have the ability to look at Layer 2 through Layer 7 of the OSI model. This includes headers and data protocol structures as well as the actual payload of the message. The DPI will identify and classify the traffic based on a signature database that includes information extracted from the data part of a packet, allowing finer control than classification based only on header information.

A classified packet can be redirected, marked/tagged (see QoS), blocked, rate limited, and of course reported to a reporting agent in the network. In this way, HTTP errors of different classifications may be identified and forwarded for analysis. Many DPI devices can identify packet flows (rather than packet-by-packet analysis), allowing control actions based on accumulated flow information.

DPI allows phone and cable companies to readily know the packets of information a user is receiving online, from e-mail, to websites, to sharing of music, video and software downloads as would a network analysis tool. This is the approach that cable operators and ISPs use to dynamically allocate bandwidth according to traffic that is passing through their networks. Thus, for example, a higher priority can be allocated to a VoIP call versus web browsing.

DPI is also increasingly being used in security devices to analyze flows, compare them against policy, and then treat the traffic appropriately (i.e., block, allow, rate limit, tag for priority, mirror to another device for more analysis or reporting). Since the DPI device looks at each individual packet, it can be used by ISPs to provide or block services on a user by user basis.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation that may be apparent to those skilled in the art. Accordingly, the present invention resides in the novel methods, arrangements, combinations, and improvements herein shown and described in various exemplary embodiments.

SUMMARY OF THE INVENTION

Unfortunately, in its existing form, DPI and related systems are not able to provide an in-bound mechanism that verifies end-to-end service configuration with application awareness. In light of the present need for an in-bound mechanism that verifies end-to-end service configuration with application awareness, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments efficiently configure routers in an SP network, specifically with respect to the treatment of traffic flows at the application level. This is believed to be beneficial to application-level service being offered.

Currently, this capability does not exist. Configuration verification at the customer level is possible using separate DPI systems, but this does not provide an application-level granularity that is desirable and does not provide data plane forwarding verification. Thus, various exemplary embodiments enable configuration verification at the customer level with a desirable amount of application-level granularity.

To solve the problems described herein, various exemplary embodiments include a new type of service ping packet. This is referred to herein as an application specific service ping packet.

A packet of this type includes an indication of the application which is being tested, or simulated, by the packet. This allows DPI equipment to quickly determine the application in question from only one packet.

Any associated application parameters specifying what type of configuration information is to be gathered for application or any part of it, including configuration pertaining to dynamic traffic policies applied to the packet for verifying the configuration of such policies in network routers that processed the packet can also be included in the packet as well as a loopback indication if the packet is to be looped back to its source when it reaches its destination to allow bi-directional data plane verification especially when both directions are not traversing the same path.

Accordingly, in various exemplary embodiments, an application specific service ping packet is created for a given traffic flow, such as a traffic flow from one customer to another customer, for a given application. The application specific service ping packet is injected into the network at any point including a source of the originating packet or provider edge equipment interface. The application specific service ping packet then transits across a network to its predefined destination which can include another provider edge equipment interface or the final destination of the application traffic.

In various exemplary embodiments, while the application specific service ping packet is in transit across the network, it collects information on the application configuration/flow dependent traffic handling policies that are applied to it while it is in transit. These policies can be both static and dynamic.

In various exemplary embodiments, the information collected in the packet may come from all nodes capable of providing such information or only from nodes specified in the packet to include the information requested. In various exemplary embodiments, the collected information is compared against an expected result for the given traffic flow to verify the configuration of the routers through which the given traffic flow passed while transiting the network. In various exemplary embodiments, one or more of the steps in the procedure described above are repeated starting at the other provider edge equipment interface and sending another, or the same looped back, packet in the opposite direction towards the other interface to perform a continuity check for example of a data plane.

BRIEF DESCRIPTION OF THE DRAWINGS

In order to better understand various exemplary embodiments, reference is made to the accompanying drawings, wherein:

FIG. 2 is a fragmented schematic diagram of an exemplary application specific service ping packet for an in-bound mechanism that verifies end-to-end service configuration with application awareness;

FIG. 3 is a schematic diagram of an exemplary application identification field for an application specific service ping packet for an in-bound mechanism that verifies end-to-end service configuration with application awareness;

FIG. 4 is a fragmented schematic diagram of an exemplary application mapping table for use with a system and method for an in-bound mechanism that verifies end-to-end service configuration with application awareness.

DETAILED DESCRIPTION OF THE PREFERRED EMBODIMENTS OF THE INVENTION

Figure 1:
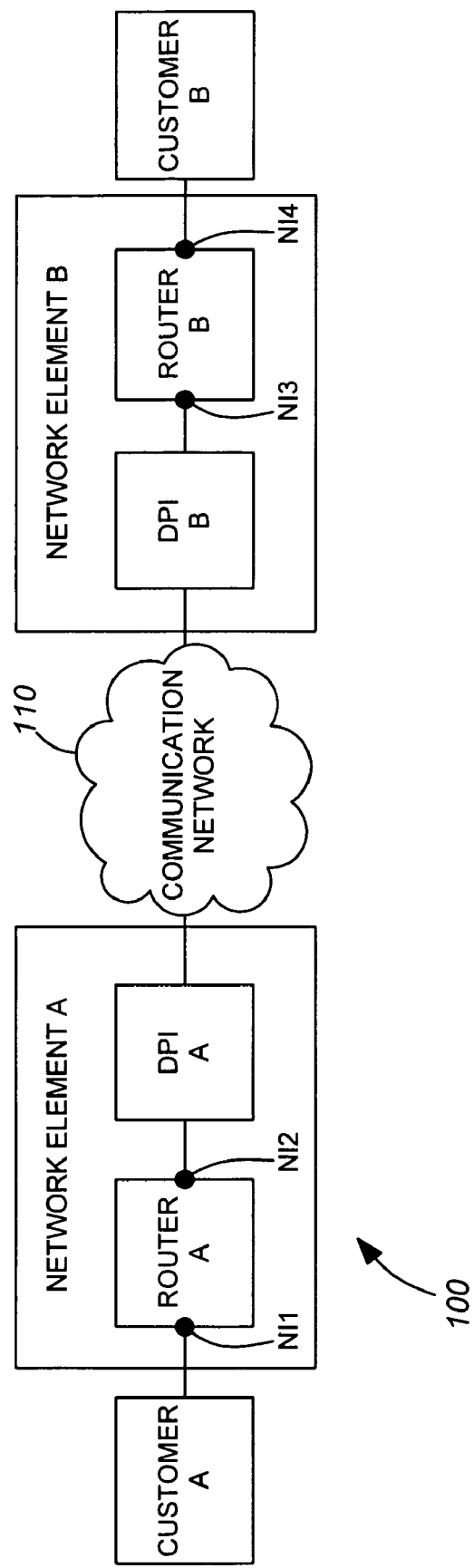
FIG. 1 is a schematic diagram of an exemplary system for an in-bound mechanism that verifies end-to-end service configuration with application awareness.

Referring now to the drawings, in which like numerals refer to like components or steps, there are disclosed broad aspects of various exemplary embodiments.

FIG. 1 is a schematic diagram of an exemplary system 100 for an in-bound mechanism that verifies end-to-end service configuration with application awareness. Communications in system 100 travel between customer A and customer B through network element A, communication network 110, and network element B.

Network element A includes a router A and a DPI A. Likewise, network element B includes a router B and a DPI B. However, it should be noted that, in various exemplary embodiments network element A itself is a DPI. Likewise, in various exemplary embodiments, network element B is itself a DPI.

In other words, network element A can take any possible form as long as it has or is a DPI. The same is true of network element B. Likewise, network element A and network element B have application processing such as QoS, policing, remarking of a packet, and so on, and DSCP that affects the path the packet traverses in the communications network 110.

It should also be noted that the invention described herein will function in a system 100 containing any number of DPIs greater than one. In exemplary system 100, only two DPIs are shown for simplicity. They are DPI A and DPI B.

In exemplary system 100, router A is shown with network interface (NI) NI1 and NI2. Likewise, router B is shown with NI3 and NI4. It should be apparent that, in embodiments of system 100 that exclude router A and router B, NI1, NI2, NI3 and NI4 are relocated as appropriate. In various exemplary embodiments, one or more of NI1, NI2, NI3, NI4 are provider edge equipment interfaces.

In various exemplary embodiments multiple customers can be attached to provider edge equipment interfaces NI1 and NI4 directly or indirectly though another network including, but not limited to, bridges, switches or routers. The application traffic may be of any point-to-point, point-to-multipoint, multipoint-to-point or multipoint-to-multipoint nature.

The invention will now be described in greater detail in connection with FIGS. 2-5. In connection with FIGS. 2-5, reference back to FIG. 1, and the elements depicted therein, will be made to further expand on the functions and inter-relationships of the structure depicted in connection with exemplary system 100.

FIG. 2 is a fragmented schematic diagram of an exemplary application specific service ping packet 200 for an in-bound mechanism that verifies end-to-end service configuration with application awareness. Exemplary ping packet 200 includes a standard DPI flow ID 210, special ping packet ID 215, a DPI special packet ID 220, and an application ID 230. In some embodiments DPI special packet ID 220 may not be required and a combination of special ping packet ID 215 and application ID 230 may suffice.

The DPI special packet ID 220 and application ID 230 are portions of the ping packet 200 not previously included in other known forms of ping packets. The standard DPI flow ID 210 represents information normally required by a DPI to identify a particular flow. The content in exemplary packet 200 preceding the standard DPI flow ID 210 is omitted in FIG. 2 for simplicity. This is represented by the fragmented portion of FIG. 2.

The DPI special packet ID 220 sits behind the standard DPI flow ID 210 and special ping packet ID 215 in exemplary application specific service ping packet 200. The DPI special packet ID 220 represents information in exemplary application specific service ping packet 200 that enables the DPI, such as DPI A or DPI B, to recognize that the application specific service ping packet 200 is a special kind of DPI packet that is to be processed by this specific or any DPI element. In some embodiments identification of the DPI to process the packet may be not part of the DPI special packet ID but instead part of any other fields in the packet like Standard DPI Flow ID 210 or Application ID 230 or Special Ping Packet ID 215. This information can be implemented according to any currently known, or later developed technique known in the art.

The application ID 230 represents application specific data that classifies the packet as if it belonged to a pre-determined application. However, because of the DPI special packet ID 220 or special ping packet ID 215 (when special packet ID 220 is not required), the exemplary application specific service ping packet 200 is able to associate the identified application to the DPI using only a single packet. This represents a significant improvement over previously known techniques for identifying an application because all such techniques require the inspection of a plurality of packets before an associated application can be identified.

FIG. 3 is a schematic diagram of an exemplary application identification field 230 for an application specific service ping packet for an in-bound mechanism that verifies end-to-end service configuration with application awareness. Exemplary application identification field 230 includes a type field 233, a length field 236 and a value field 239.

In various exemplary embodiments, the type field 233 is used to identify a type of application to which the identified application belongs. In various exemplary embodiments the length field 236 identifies an associated length.

In various exemplary embodiments the value field 239 contains a value for information associated with the application identified by exemplary application ID field 230. Examples of the content of the value field 239 include an application code point and an application data point. In various exemplary embodiments, the application ID field 230 carries more than one type length value (TLV) fields. Accordingly, in various exemplary embodiments, the application ID field 230 includes nested TLV fields that define application identification and processing by DPI. Likewise, in various exemplary embodiments, the application ID field 230 includes multiple application IDs that correspond to, for example, multiple applications, multiple subsets of a single application, or a combination thereof. It should also be apparent that, in various exemplary embodiments, the information in the application ID field 230 is encoded according to any format other than TLV currently known, or later developed.

FIG. 4 is a fragmented schematic diagram of an exemplary application mapping table 400 for use with a system and method for an in-bound mechanism that verifies end-to-end service configuration with application awareness. The mapping table 400 includes two columns. The first column is labeled application ID. The second column is labeled application name.

As depicted application mapping table 400 contains three lines of data. The first line has an application ID 1. The second line has an application ID 2. The third line has an application ID 3. It should be apparent that the application IDs depicted are overly simple. Thus, it should be equally apparent that any arbitrary value or character string can be used to correspond to an application in the application ID column.

In application mapping table 400, the fields for the application names are left blank. However, it should be apparent than an actual implementation of the mapping table 400 would include names in the application name column corresponding to each of the corresponding application IDs in each row of table 400.

Application mapping table 400 is fragmented to represent that any number of application IDs may be included in the application mapping table 400. The use of application mapping table 400 will be described in greater detail below in connection with FIG. 5.

Figure 5:
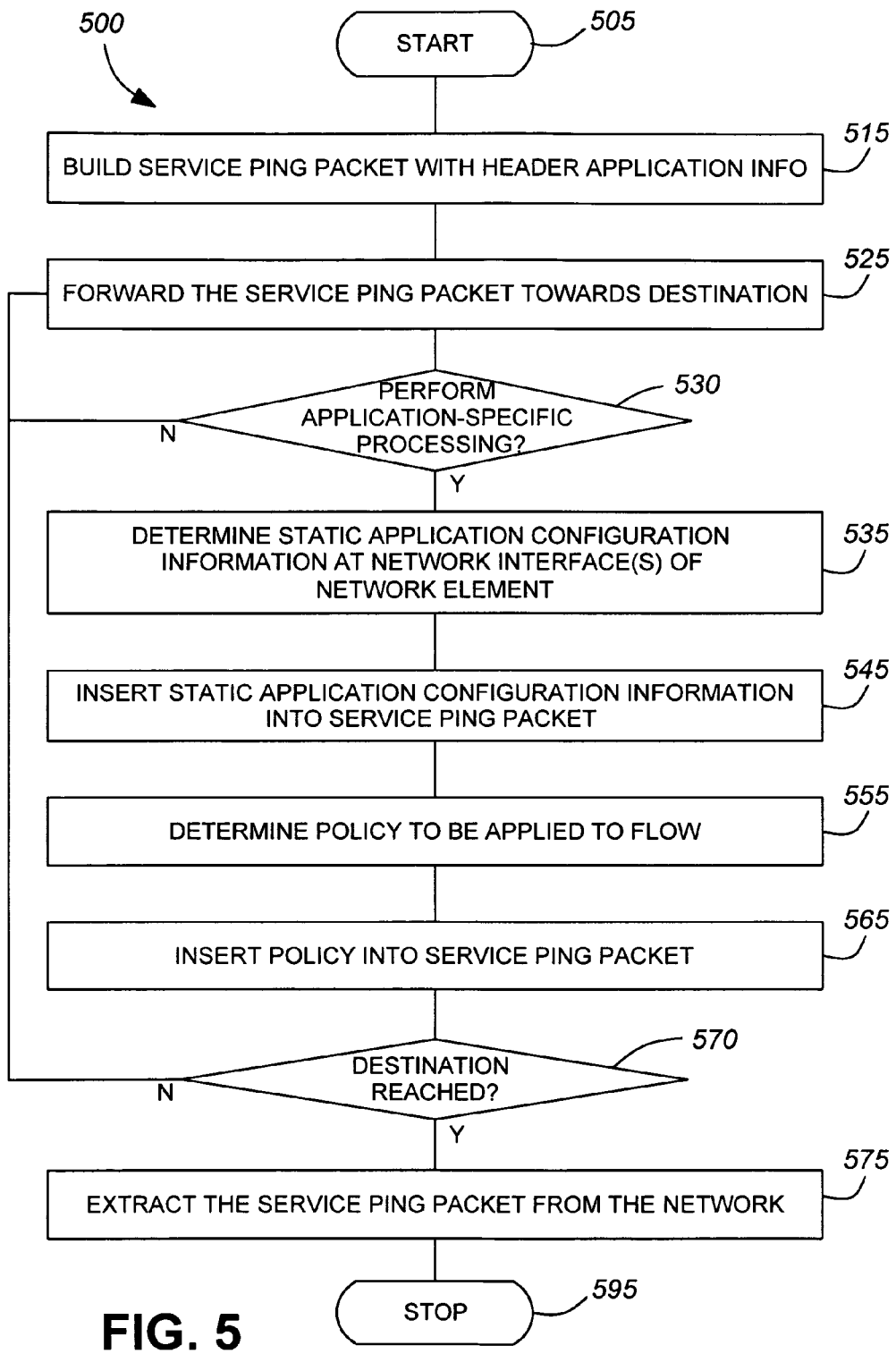
FIG. 5 is a flowchart of an exemplary method of verifying end-to-end service configuration with application awareness.

FIG. 5 is a flowchart of an exemplary method 500 of verifying end-to-end service configuration with application awareness. The method 500 starts in step 505 and continues to step 515.

In step 515, a service ping packet is built, i.e. formed, with header application information (info). In various exemplary embodiments, the service ping packet of step 515 corresponds to application specific service ping packet 200, described above in connection with at least FIG. 2 and FIG. 3.

In step 525, the service ping packet built in step 515 is forwarded towards a destination in the system 100. In various exemplary embodiments, this includes the service ping packet being injected, i.e. loaded, into the network at Customer A or any interface along the communication path to Customer B including a network interface, such as NI1, NI2, NI3, NI4. Next, in step 530, a determination is made whether application-specific processing is to be performed.

When a determination is made in step 530 that application-specific processing is not to be performed, the method 500 returns to step 525, where the service ping packet continues to be forwarded towards the destination. When a determination is made in step 530 that application-specific processing is to be performed, the method 500 proceeds to step 535. Then, in step 535, static application configuration information is determined at one or more network interface(s) of the network element, such as NI1, NI2 of network element A or NI3, NI4 of network element B.

In step 545, the static application configuration information determined in step 535 is inserted into the service ping packet. In step 555, a policy to be applied to the flow is determined. In various exemplary embodiments, the policy (or policies) determined in step 555 is (are) determined from a policy lookup table. Then, in step 565, the policy determined in step 555 is inserted into the service ping packet.

An example of a policy that affects a given flow would be the volume of the flow relative to the time of the flow. For example, a given system may allow a greater volume for a particular flow late at night when other traffic through the network is generally low. The determination of the policy or policies and insertion of same into the service ping packet corresponds to the dynamic configuration information discussed elsewhere herein.

In step 570, a determination is made whether the destination for the ping packet has been reached. When a determination is made in step 570 that the destination has not been reached, the method 500 returns to step 525 where the service ping packet continues to be forwarded towards the ping destination. When a determination has been made in step 570 that the destination has been reached, the method 500 proceeds to step 575.

In step 575, the service ping packet is extracted from the network. For the sake of simplicity, step 575 is shown only following step 570. However, it should be apparent that, in various exemplary embodiments, the service ping packet is extracted from the network following any one or more of the preceding steps. Following step 575, the method 500 proceeds to step 595 where the method 500 stops.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of verifying end-to-end service configuration with application awareness, comprising:
    building an application specific service ping packet having an application identification field that identifies an application to which the application specific service ping packet corresponds and a second field that enables a Deep Packet Inspection (DPI) device to associate the identified application with the application specific service ping packet;
    forwarding the application specific service ping packet towards a destination in a network;
    determining, with the DPI device, static configuration information regarding the application to which the application specific service ping packet corresponds at a network interface of a network element;
    inserting the static configuration information into the application specific service ping packet;
    determining at least one policy that applies to a flow including the application specific service ping packet;
    inserting the at least one policy into the application specific service ping packet; and
    extracting the service ping packet from the network.

2. The method of claim 1, further comprising
    extracting the service ping packet from the network following the step of building an application specific service ping packet having an application identification field that identifies an application to which the application specific service ping packet corresponds.

3. The method of claim 1, further comprising:
extracting the service ping packet from the network following the step of forwarding the application specific service ping packet towards a destination in a network.

4. The method of claim 1, further comprising:
extracting the service ping packet from the network following the step of determining static configuration information.

5. The method of claim 1, further comprising:
extracting the service ping packet from the network following the step of inserting the static configuration information into the application specific service ping packet.

6. The method of claim 1, further comprising:
extracting the service ping packet from the network following the step of determining at least one policy that applies to a flow including the application specific service ping packet.

7. The method of claim 1, wherein forwarding the application specific service ping packet comprises:
injecting the application specific service ping packet into the network at a network interface.

8. The method of claim 1, further comprising:
determining that the destination has not been reached.

9. The method of claim 8, further comprising repeating the steps of:
forwarding the application specific service ping packet towards the destination;
determining static configuration information regarding the application to which the application specific service ping packet corresponds at a network interface of a network element;
inserting the static configuration information into the application specific service ping packet;
determining at least one policy that applies to a flow including the application specific service ping packet;
inserting the at least one policy into the application specific service ping packet; and
extracting the service ping packet from the network.

10. The method of claim 1, further comprising:
comparing the static configuration information against an expected result.

11. The method of claim 10, further comprising:
verifying a configuration of one or more routers in the network by the comparison.

12. The method of claim 11, wherein the application specific service ping packet has transited the one or more routers in the network.

13. The method of claim 1, wherein building an application specific service ping packet further comprises:
specifying what type of information is to be included in the application specific service ping packet.

14. The method of claim 13, further comprising:
selecting the type of information to be included in the application specific service ping packet from the list consisting of a subset of static information, a subset of dynamic information, and subsets of both static information and dynamic information.

15. The method of claim 1, wherein forwarding the application specific service ping packet further comprises:
injecting the application specific service ping packet into the network at a customer interface.

16. The method of claim 1, wherein the application specific service ping packet is a loopback packet.

17. The method of claim 1. further comprising:
extracting the application specific service ping packet at a predetermined point in the network.

18. The method of claim 1, further comprising:
looping back the application specific service ping packet at a predetermined point in the network.

19. The method of claim 1, wherein a specific subset of DPI elements in the network are used to process the application specific service ping packet along a communications path.

20. The method of claim 1, wherein the application specific service ping packet specifies a subset of nodes in the network that are to process the application specific service ping packet by including an Id of the nodes in the network that are to process the application specific service ping packet.

21. The method of claim 20, wherein the Id of the nodes in the network that are to process the application specific service ping packet is part of a field in the application specific service ping packet.

22. The method of claim 20, wherein the Id of the nodes in the network that are to process the application specific service ping packet is part of a field in the application specific service ping packet selected from the list consisting of ping destination, Application ID, and special packet ID.

* * * * *